July 7, 1936.   W. BREWER   2,047,096
CHARGING VALVE FOR SIPHON BOTTLES
Filed Feb. 9, 1935
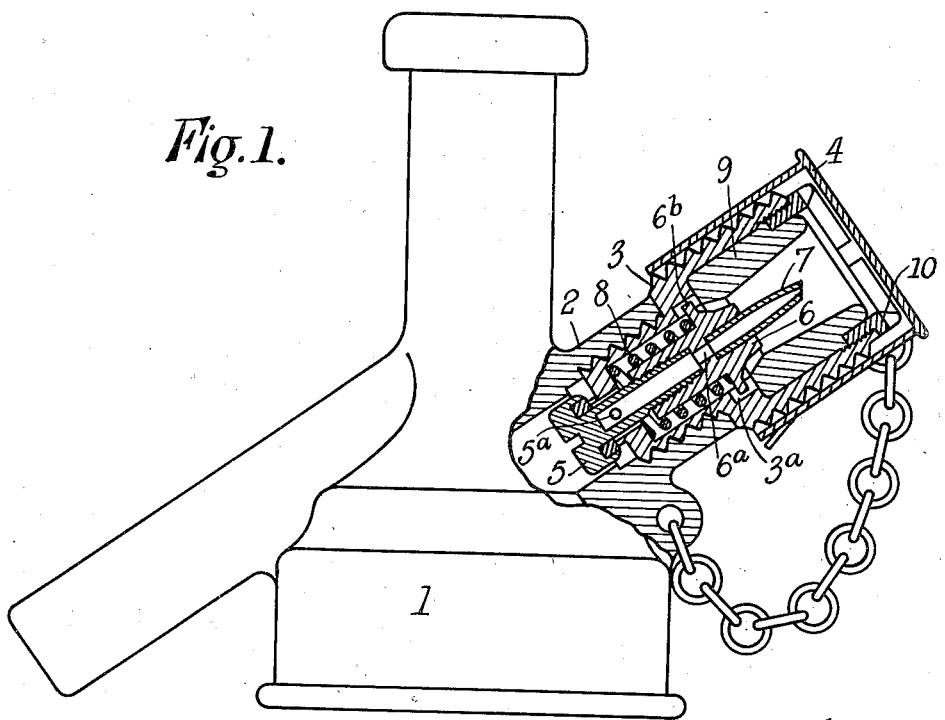
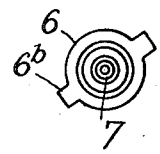
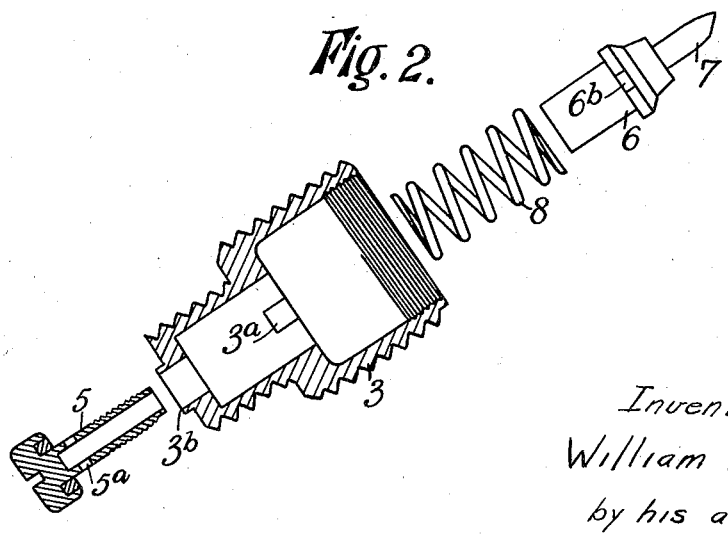
Inventor
William Brewer
by his attorneys
Howson and Howson Patented July 7, 1936

2,047,096

UNITED STATES PATENT OFFICE 2,047,096

CHARGING VALVE FOR SIPHON BOTTLES

William Brewer, Edmonton, England, assignor to Sparklets Limited, Edmonton, England, a British company Application February 9, 1935, Serial No. 5,880
In Great Britain January 21, 1935

2 Claims. (Cl. 225—17)

This invention relates to the charging valves of siphon bottles and the like vessels for use in aerating liquids or spraying solutions of the kind for example described in British specifications Nos. 10,801A A. D. 1905 and 392,433 wherein the said valves control the admission into the vessels of gas, such as carbon dioxide, under high pressure liberated from a capsule, for example of the kind known under registered trade-mark as "Sparklets" and retain the pressure in the vessels when the gas contents of the capsule have been discharged.

In the known constructions of valves of this kind it is difficult without the aid of special appliances to assemble the parts or to disassemble the valve for the purpose of replacing parts damaged or inefficient owing to wear and tear as is on occasion necessary. The object of this invention is to provide a construction of valve whereby it can be more readily assembled than hitherto and dismantling, for the purpose of cleaning or replacement of any of the parts, can be effected without the aid of special appliances.

According to this invention a charging valve of vessels of the kind referred to comprises a spring-pressed plunger in a detachable housing adapted for the reception of a capsule containing gas under pressure, a piercing pin in one end of the plunger, a valve screwed into its other end, the head of the said valve controlling an outlet port communicating with the interior of the vessel, and interengaging means between the plunger and the housing, for example lugs carried on one of the latter elements engaging in slots in the other element, whereby rotation of the said plunger is prevented. The head of the screwed valve is provided with notches or a slot whereby it can be engaged and turned by a screwdriver and the interengaging means between the housing and the plunger prevent rotation of the latter when it is required to screw the valve into, or to unscrew it from, the said plunger.

The invention will now be more particularly described with reference to the accompanying drawing wherein its application to the head of an ordinary siphon bottle is shown and wherein Figure 1 is an elevation partly in section of the head of the bottle, Figure 2 is an exploded view of the valve assembly and Figure 3 is a plan of the piercing pin and plunger.

In the drawing the head 1 of the bottle is provided with an internally screw-threaded socket 2 for the reception of a housing or plug 3, the outer enlarged portion of which is externally screw-threaded to receive a holder (not shown) for the capsule containing a gas under high pressure when it is required to charge the vessel with the said gas. After the vessel has been charged, the holder is removed and replaced by the dust cover 4 shown. A port 3$^b$ is provided in the inner end of the plunger 3, this port communicating with the interior of the head 1 and being controlled by a valve 5 the head of which is provided with an inset rubber washer to ensure a gas-tight joint at the valve seating. The valve stem is hollow and is screwed into the inner end of a plunger 6 in the outer end of which is secured a hollow piercing pin 7. A bore 6$^a$ in the plunger provides a communicating passage between the hollow stem and pin. A helical compression spring 8 maintains the valve head normally closed on its seating by its confinement between the inner end of the plug 3 and a flange on the plunger 6. A cylindrical tapered rubber washer 9 is fitted within the enlarged outer portion of the plug 3 and held in position by a ring-nut 10. The washer 9 acts to provide a progressively tighter packing for the neck of the gas capsule when it is forced by its holder onto the piercing pin 7. In operation, the pressure of the capsule on the pin overcomes the resistance of the spring 8 and moves the valve 5 off its seating whereupon the gas from the capsule escapes through the passages in the pin, the plunger and the stem, respectively, and passes therefrom by way of openings 5$^a$ in the said valve stem through the port 3$^b$ and into the vessel. To screw the valve 5 into, or unscrew it from, the plunger 6, a slot is provided in its head whereby it can be turned by a screwdriver and in order to prevent the plunger rotating with the valve during the operations, lugs 6$^b$ are provided on the plunger which engage in slots 3$^a$ in the wall of the plug 3. In order to prevent these lugs 6$^b$ from being forced by the spring 8 out of their slots and into the rubber washer 9 when the valve 5 is unscrewed and to facilitate the easy removal of the said valve, it is preferable to exert a pressure on the plunger to counteract that of the said spring. This may conveniently be effected by screwing the holder containing a spent capsule onto the plug 3, the capsule thereby acting to depress the plunger by its engagement with the piercing pin. In the same manner the operation of screwing in a valve can also be facilitated as the valve is thereby relieved of the stress exerted by the spring and a further advantage is obtained in that the inset washer of the valve head during rotation is thereby freed from frictional contact with its seating and so renders it immune from any damage which might otherwise result.

What I claim is:—

1. A charging valve of vessels of the kind referred to comprising a spring-pressed plunger in a detachable housing adapted for the reception of a capsule containing gas under pressure, a tubular piercing pin in one end of the plunger, a valve screwed into the other end of said plunger, the head of said valve controlling an outlet port from said pin and plunger communicating with the interior of the vessel, and interengaging means between the plunger and the housing whereby rotation of the said plunger is prevented.

2. A charging valve as claimed in claim 1, wherein the interengaging means comprise lugs on the plunger which engage in slots in the housing.

WILLIAM BREWER.